(12) United States Patent
Grove

(10) Patent No.: US 6,592,137 B2
(45) Date of Patent: Jul. 15, 2003

(54) LICENSE PLATE MOUNTING FOR A MOTORCYCLE FRAME

(76) Inventor: James E. Grove, 4316 Marina City Dr., #423CTN, Marina del Rey, CA (US) 90292

( * ) Notice: Subject to any disclaimer, the term of this patent is extended or adjusted under 35 U.S.C. 154(b) by 269 days.

(21) Appl. No.: 09/729,363

(22) Filed: Dec. 5, 2000

(65) Prior Publication Data

US 2002/0067022 A1 Jun. 6, 2002

(51) Int. Cl.[7] ............................................. B62J 39/00
(52) U.S. Cl. ........................................................ 280/288.4
(58) Field of Search ........................... 280/281.1, 283, 280/288.4; 359/838, 841; D20/13; 40/209, 200, 211

(56) References Cited

U.S. PATENT DOCUMENTS

| 4,422,659 | A | * | 12/1983 | Nebu ...................... 280/152.1 |
| 4,548,483 | A | * | 10/1985 | Moro et al. ................ 350/635 |
| 4,645,316 | A | * | 2/1987 | Ohyama ...................... 350/632 |
| 4,790,087 | A | * | 12/1988 | Hamada et al. ............... 40/204 |
| 4,958,451 | A | * | 9/1990 | Iwakura et al. ............... 40/204 |
| 4,982,926 | A | * | 1/1991 | Mori et al. ................... 248/479 |
| 5,182,676 | A | * | 1/1993 | Iwai et al. ................... 359/841 |
| 5,305,144 | A | * | 4/1994 | Mori et al. ................... 359/507 |
| 5,375,014 | A | * | 12/1994 | Fujie et al. .................. 359/841 |
| 5,524,918 | A | * | 6/1996 | Peabody et al. ............. 280/291 |
| 5,940,230 | A | * | 8/1999 | Crandall ...................... 359/838 |
| 6,017,126 | A | * | 1/2000 | Matsuura et al. ............ 359/872 |
| 6,109,755 | A | * | 8/2000 | Duroux et al. ............... 359/838 |
| 2001/0028517 | A1 | * | 10/2001 | Juraschek ................... 359/838 |
| 2001/0030819 | A1 | * | 10/2001 | Hattori et al. ............... 359/838 |

FOREIGN PATENT DOCUMENTS

| EP | 0519115 A1 | * | 12/1992 |
| EP | 0620138 A1 | * | 7/1997 |
| EP | 0678420 A1 | * | 3/2000 |

OTHER PUBLICATIONS

US 2001/0030819 A1—Hattori et al.—10-2001—Classification 359/838.*
US 2001/0028517 A1—Juraschek—10-2001—Classification 359/838.*

* cited by examiner

Primary Examiner—J. J. Swann
Assistant Examiner—Laura Rosenberg
(74) Attorney, Agent, or Firm—Jack C. Munro

(57) ABSTRACT

A license plate mounting to be mounted a foot peg mounting tab of a motorcycle frame. The license plate mounting is deflectable from an extended position to a deflected position with the extended position extending outward away from the frame of the bicycle and the deflected position places the license plate frame in juxtaposition to the motorcycle frame. The license plate frame is readily movable from the deflected position back to the extended position.

4 Claims, 3 Drawing Sheets

LICENSE PLATE MOUNTING FOR A MOTORCYCLE FRAME

BACKGROUND OF THE INVENTION

1. Field of the Invention

This invention pertains to a frame for mounting of a license plate and more particularly to a license plate frame which is to be mounted in conjunction with a motorcycle skeleton which permits the license plate frame to be movable from an extended position to a deflected position.

2. Description of the Related Art

License plates are commonly mounted in conjunction with the rear fender of a motorcycle. However, some motorcycles are custom constructed so as to not permit the mounting of the license plate on the fender. In such a situation, it has been common in the past to mount the license plate on a separate license plate frame which is mounted on the skeleton of the motorcycle with the license plate frame extending in an outward direction. This outwardly extending frame is readily subjected to being struck by a fixed object or a person's leg. If the license plate frame contacts a fixed object, it is readily capable of being broken. When contacting a person's leg, the person's leg is readily susceptible to injury.

Also, there are times when motorcycles fall over from an upright position. This could happen when the motorcycle is on its mounting stand, or it could happen in an accident situation when the motorcycle is being operated. Invariably, in such a situation, the force caused by the weight of the motorcycle may be applied directly to the license plate frame causing the license plate frame to break.

There is a need to construct a license plate frame for a motorcycle which would not be subjectable to being broken upon the license plate frame encountering an outside force.

SUMMARY OF THE INVENTION

A primary objective of the present invention is to construct a license plate frame that will readily deflect from an outwardly extended normal usage position to a retracted or deflected position to be located alongside the motorcycle skeleton.

Another objective of the present invention is to construct a license plate mounting which could be manufactured at a reasonable cost and therefore sold to the ultimate consumer at a reasonable cost.

Another objective of the present invention is to construct a license plate mounting which can be readily attached on an after market basis to a motorcycle not requiring any special skill.

The license plate mounting in the present invention utilizes a license plate frame that has a V-shaped recess. The V-shaped recess is to connect with a V-shaped cam surface mounted on a sleeve. The frame is connected to the sleeve by means of a biasing fastener arrangement which will permit the license plate frame to deflect relative to the sleeve upon the application of a small outside force from the extended position to a deflected position located alongside the skeleton of the motorcycle. The sleeve is to be fixedly secured onto a foot peg mounting tab of the motorcycle skeleton.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE PREFERRED EMBODIMENT

Figure 1:
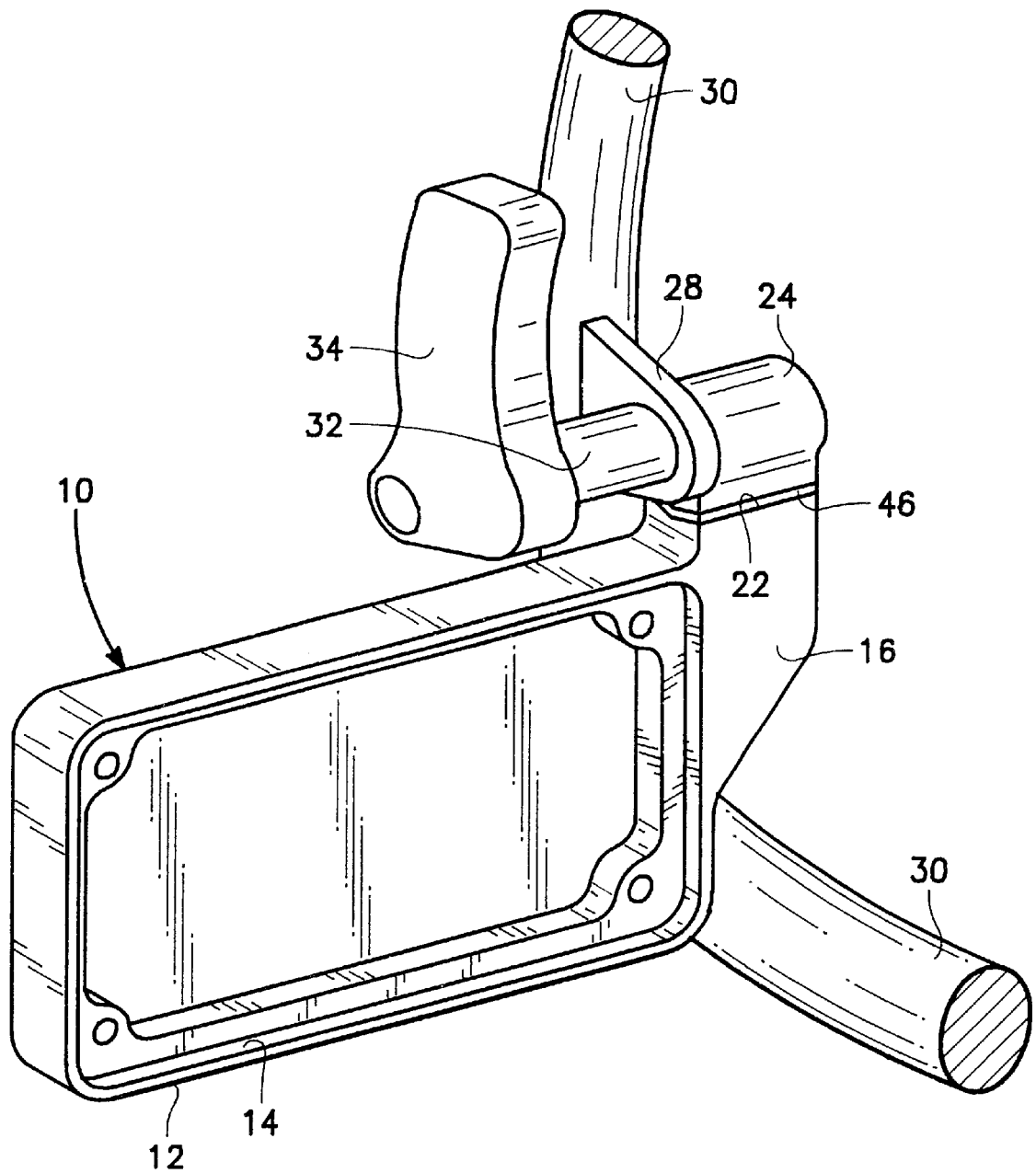
FIG. 1 is an isometric view of the license plate mounting of the present invention showing such to be mounted in conjunction with a motorcycle skeleton.
Figures 2, 3:
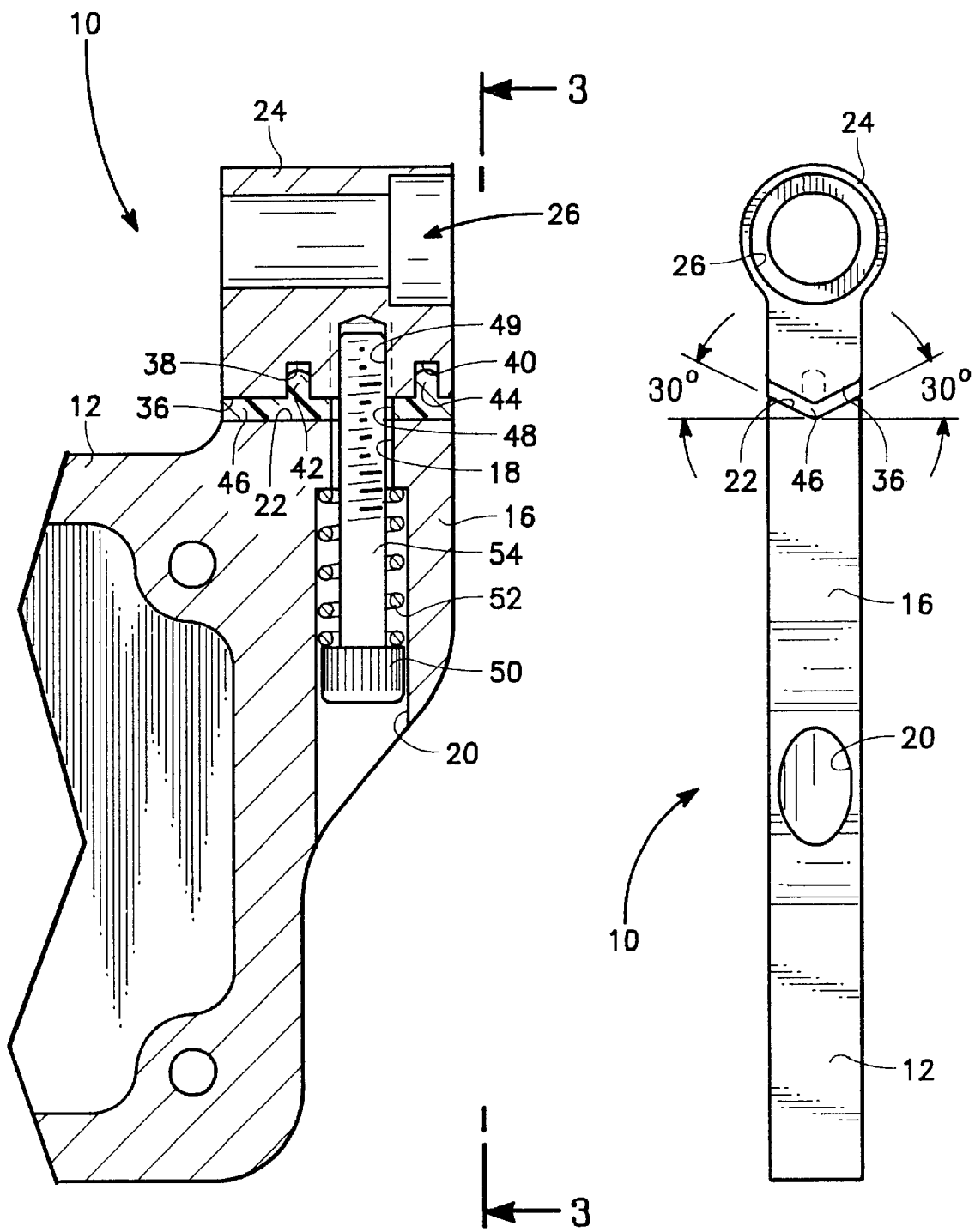
FIG. 2 is a cross-sectional view of the license plate mounting of the present invention showing the license plate mounting in the normal usage position which is also defined as the extended position.
FIG. 3 is an end view of the license plate mounting of the present invention taken along line 3—3 of FIG. 2.

Referring particularly to the drawings, there is shown a license plate mounting 10 of this invention. The license plate mounting 10 would normally be constructed of a metallic material, such as aluminum or steel. However, it is to be considered within the scope of this invention that it could be constructed of other rigid materials, such as plastic.

The mounting 10 includes a license plate frame 12. The license plate frame 12 includes a rectangularly shaped cavity 14 within which is adapted to be located a license plate for a motor vehicle, such as a motorcycle. The license plate is not shown. Integrally connected to the license plate frame 12 is an extension 16. The extension 16 includes a through hole that is formed of a smaller diametered section 18 and a larger diametered section 20. The upper end of the extension 16 terminates in a V-shaped recess 22.

A sleeve 24 includes a through hole 26. The through hole 26 is to have mounted therein a fastener (not shown) with this fastener to extend through a hole (not shown) formed within a mounting tab 28 of a motorcycle skeleton 30. The fastener, which is not shown, is to be secured to foot peg shaft 32 on which is pivotally mounted a foot peg 34. The foot peg 34 is to be pivoted from the upwardly extending position shown in FIG. 1 to a downwardly extended position which is located substantially horizontal as opposed to the vertical position shown in FIG. 1 which will permit the foot peg 34 to connect with a foot (not shown) of a motorcycle rider. Normally, the mounting tab 28 is solely for the purpose of mounting of the foot peg 34 and the foot peg shaft 32. However, the license plate mounting 10 of this invention is capable of using this mounting tab 28 as the means of attaching the license plate mounting 10 of this invention onto the motorcycle skeleton 30.

The sleeve 24 has a V-shaped cam surface 36. This V-shaped cam surface 36 is formed thirty degrees from horizontal on each side of the V making the total angle of the V-shaped cam surface to be one hundred twenty degrees. The V-shaped recess has the same angular relationship. Formed within the sleeve 24, and connecting with the V-shaped cam surface 36, are a pair of holes 38 and 40. Hole 38 is to snugly connect with a pin 42 and hole 40 is to snugly connect with a pin 44. Pins 42 and 44 are usually constructed of a plastic material and are integrally connected to a protective plate 46. This protective plate 46 will also be of the same plastic type of material. The protective plate 46 assumes the same V-shaped configuration as previously described so that the plate 46 will be located directly against the V-shaped cam surface 36. It is a function of the protective plate 46 to provide a smooth, low frictional surface that will permit relative movement between the sleeve 24 and the extension 16.

Figures 4, 5:
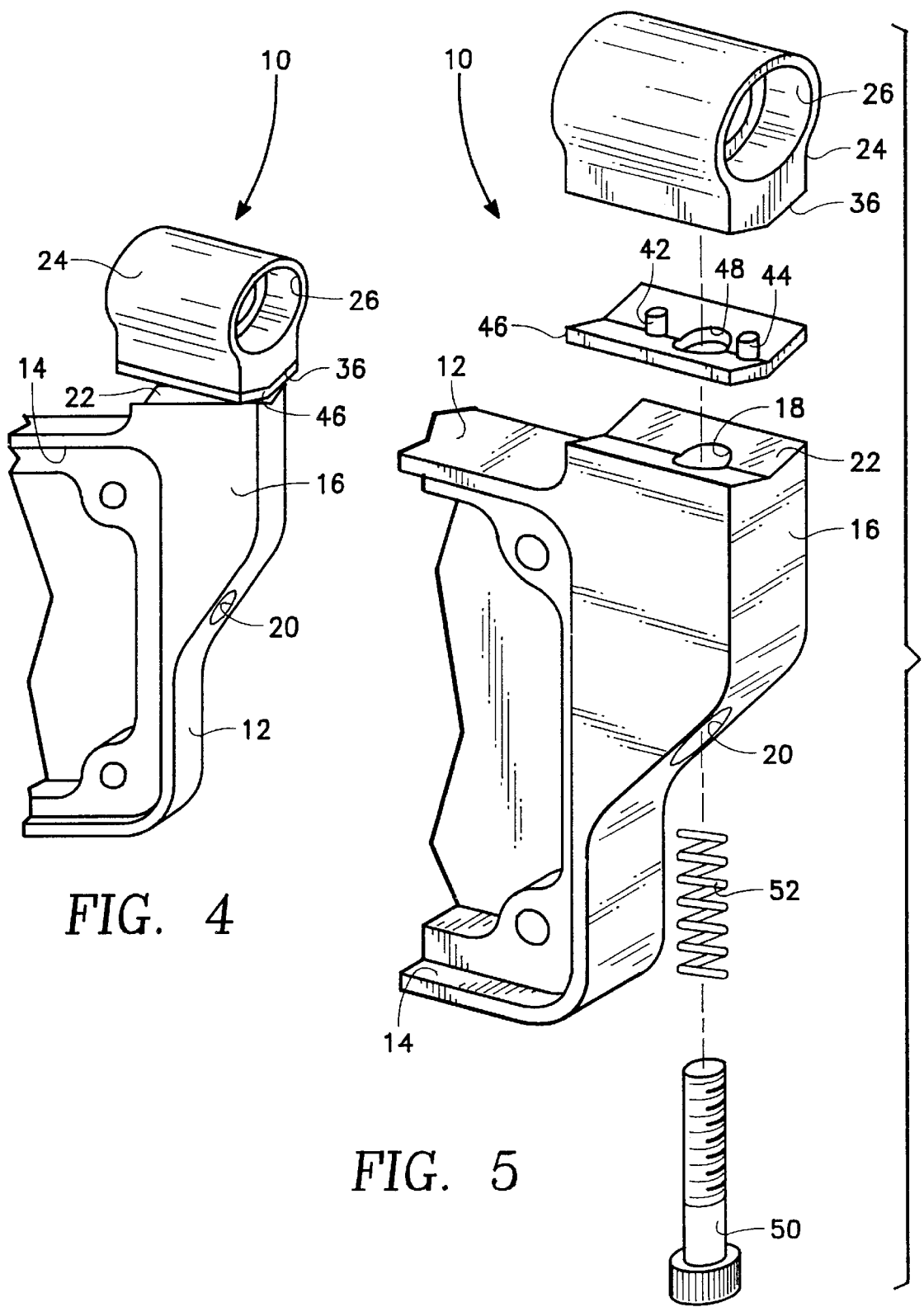
FIG. 4 is an isometric view of a portion of the license plate mounting of the present invention which is shown in a partially deflected position.
FIG. 5 is an exploded isometric view of the license plate mounting of the present invention.

The protective plate 46 includes a hole 48 which is located between the pins 42 and 44. A bolt fastener 50 has mounted thereon a coil spring 52. The bolt fastener 50 and the coil spring 52 are to be mounted within the large diameter section 20 with the threaded end 54 of the bolt fastener 50 extending through the smaller diameter section 18, through the hole 48 and be threadably secured within a hole 49 formed in sleeve 24. The bolt fastener 50 is to be tightened sufficiently so that it will take about three and one-half pounds of force required to strike the license plate frame 12 to cause relative pivoting movement to occur of the license plate frame 12 relative to the sleeve 24. This relative movement is shown in FIG. 4 of the drawings.

With the license plate frame 12 in the position shown in FIG. 1 of the drawings, the license plate would be readily observable rearward of the motorcycle, which is required by state traffic laws. If the motorcycle tips over, or if the license plate mounting 10 encounters some exterior object, it is capable of pivoting in either direction from the outwardly extended position shown in FIG. 1 to a position located in juxtaposition with the motorcycle skeleton 30. This side-by-side locating of the license plate frame 12 relative to the motorcycle skeleton 30 will place the license plate frame 12 in an "out of the way" position hopefully preventing breakage of the license plate mounting 10.

The present invention may be embodied in other specific forms without departing from the essential attributes thereof. Reference should be made to the appending claims rather than the foregoing specification as indicating the scope of the invention.

What is claimed is:

1. In combination with a motorcycle skeleton which has a mounting tab for mounting of a foot peg, a license plate mounting to be secured to said mounting tab, said license plate mounting comprising:

a sleeve secured to said mounting tab, said sleeve having a V-shaped cam surface;

a license plate frame which has a V-shaped recess, said license plate frame being movable between an extended position and a deflected position, said V-shaped cam surface to matingly connect with said V-shaped recess when said license plate frame is in said extended position, said V-shaped recess having a hole; and a biasing fastener arrangement connecting said license plate frame to said sleeve, said biasing fastener arrangement being mounted within said hole, said biasing fastener arrangement permitting manual deflection of about ninety degrees of said license plate frame relative to said sleeve locating said license plate frame in said deflected position, whereby upon said license plate frame incurring an unexpected force said license plate frame automatically deflecting to an out of the way position avoiding breaking of said license plate frame.

2. The combination as defined in claim 1 including:

a non-mettalic protective plate mounted on said sleeve, said V-shaped cam surface being formed on said protective plate, said V-shaped cam surface of said said protective plate to abut against said V-shaped recess when in said extended position, said license plate frame to move relative to said protective plate when moving to said deflected position disengaging said V-shaped cam surface from said V-shaped recess.

3. The combination as defined in claim 2 wherein:

said protective plate being of plastic construction.

4. In combination with a motorcycle skeleton which has a mounting tab for mounting of a foot peg, a license plate mounting to be secured to said mounting tab, said license plate mounting comprising:

a sleeve secured to said mounting tab, said sleeve having a V-shaped cam surface;

a license plate frame which has a V-shaped recess, said license plate frame being movable between an extended position and a deflected position, said V-shaped cam surface to matingly connect with said V-shaped recess when said license plate frame is in said extended position;

a biasing fastener arrangement connecting said license plate frame to said sleeve, said biasing fastener arrangement permitting manual deflection of about ninety degrees of said license plate frame relative to said sleeve locating said license plate frame in said deflected position, whereby upon said license plate frame incurring an unexpected force said license plate frame automatically deflecting to an out of the way position avoiding breaking of said license plate frame; and a protective plate mounted on said sleeve, said V-shaped cam surface being formed on said protective plate, said V-shaped cam surface of said protective plate to abut against said V-shaped recess, when in said extended position said license plate frame to move relative to said protective plate when moving to said deflected position disengaging said V-shaped cam surface from said V-shaped recess.

* * * * *